(12) United States Patent
Li et al.

(10) Patent No.: US 10,084,561 B2
(45) Date of Patent: Sep. 25, 2018

(54) METHODS OF HANDLING ASSISTANCE INFORMATION FOR INTERFERENCE MITIGATION

(71) Applicant: Telefonaktiebolaget LM Ericsson (publ), Stockholm (SE)

(72) Inventors: Shaohua Li, Beijing (CN); Muhammad Kazmi, Bromma (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 8 days.

(21) Appl. No.: 15/113,151

(22) PCT Filed: Jan. 29, 2014

(86) PCT No.: PCT/CN2014/071728
§ 371 (c)(1),
(2) Date: Jul. 21, 2016

(87) PCT Pub. No.: WO2015/113238
PCT Pub. Date: Aug. 6, 2015

(65) Prior Publication Data
US 2017/0005744 A1      Jan. 5, 2017

(51) Int. Cl.
*H04L 12/26* (2006.01)
*H04J 11/00* (2006.01)
(Continued)

(52) U.S. Cl.
CPC ......... *H04J 11/0023* (2013.01); *H04W 24/02* (2013.01); *H04W 72/082* (2013.01); *H04W 88/02* (2013.01); *H04W 88/08* (2013.01)

(58) Field of Classification Search
CPC .................................................. H04J 11/0023
(Continued)

(56) References Cited

U.S. PATENT DOCUMENTS 9,191,833 B2   11/2015   Ahn et al.
9,337,972 B2    5/2016   Jiang
(Continued)

FOREIGN PATENT DOCUMENTS

CN        103096395        5/2013
CN        103220803        7/2013
(Continued)

OTHER PUBLICATIONS

PCT International Search Report for International application No. PCT/CN2014/071728—dated Oct. 28, 2014.
(Continued)

*Primary Examiner* — Shripal Khajuria
(74) *Attorney, Agent, or Firm* — Sage Patent Group

(57) ABSTRACT

According to some embodiments, a network node determines configuration information associated with a wireless device. The configuration information is indicative of interference mitigation capabilities of the wireless device. The network determines, based on the configuration information, whether assistance information may improve an ability of the wireless device to mitigate interference. In response to determining that the assistance information may improve the ability of the wireless device to mitigate interference, the network node sends the assistance information. The assistance information includes information used by the wireless device to mitigate interference.

20 Claims, 5 Drawing Sheets

(51) Int. Cl.
*H04W 24/02* (2009.01)
*H04W 72/08* (2009.01)
*H04W 88/02* (2009.01)
*H04W 88/08* (2009.01)

(58) Field of Classification Search
USPC ........................................................ 370/329
See application file for complete search history.

(56) References Cited

U.S. PATENT DOCUMENTS

2014/0293948 A1* 10/2014 Jiang .................... H04J 11/0056
370/329
2015/0031384 A1   1/2015 Jiang et al.

FOREIGN PATENT DOCUMENTS

CN       103444100       12/2013
EP         2966885 A1     1/2016

OTHER PUBLICATIONS

ETRI: "Signalline for NAICS" 3GPP Draft; R1-135280 NAICS, 3rd Generation partnership Project (3GPP), Mobile Competence Centre; France vol. RAN WGI Nov. 13, 2013,XP050734974, Retrived from the internet: url:http//3gpp.org/ftp/meetings_3gpp_sync/ran/ran1/docs/ *p. 3, Line 6-Line 8*.

Panasonic: "Signalling mechanisms for interference information", 3GPP Draft; R1-135401,3rd Generation partnership Project (3GPP), France, vol. RAN WG1, Nov. 13, 2013, XP050735081, Retrived from the internet: url:http//3gpp.org/ftp/meetings_3gpp_sync/ran/rani/docs/ *p. 4 paragraph*.

Supplementary search report for EP application No. 14880819.9 dated Aug. 7, 2017, 7 pages.

* cited by examiner

METHODS OF HANDLING ASSISTANCE INFORMATION FOR INTERFERENCE MITIGATION

PRIORITY

This nonprovisional application is a U.S. National Stage Filing under 35 U.S.C. § 371 of International patent application Ser. No. PCT/CN 2014/071728, filed Jan. 29, 2014, and entitled "Methods Of Handling Assistance Information For Interference Mitigation Point".

TECHNICAL FIELD

Particular embodiments relate generally to interference mitigation and more particularly to methods of handling assistance information for interference mitigation.

BACKGROUND

In a wireless network, a wireless device may communicate with one or more radio network nodes to transmit and/or receive voice traffic, data traffic, control signals, and so on. Maintaining good signal quality between the wireless device and the radio network node may allow for good performance, such as high bitrate transmissions or robust control channel performance. However, it may be difficult to maintain good signal quality in complex radio environments. For example, interfering cells may create noise that interferes with the signal quality.

SUMMARY

According to some embodiments, a network node determines configuration information associated with a wireless device. The configuration information is indicative of interference mitigation capabilities of the wireless device. The network determines, based on the configuration information, whether assistance information may improve an ability of the wireless device to mitigate interference. In response to determining that the assistance information may improve the ability of the wireless device to mitigate interference, the network node sends the assistance information. The assistance information includes information used by the wireless device to mitigate interference.

Some embodiments of the disclosure may provide one or more technical advantages. As an example, in some embodiments, signaling and/or complexity associated with mitigating interference at a wireless device may be reduced by reusing certain information from one type of interference mitigation when performing another type of interference mitigation. For example, the identity of interfering cells used during PDSCH interference mitigation may be reused when performing CRS interference mitigation. Thus, in some embodiments, redundant signaling may be avoided to reduce signaling overheads. As another example, a technical advantage of particular embodiments may include simplifying the implementation of the network node by reducing the extent to which the network node tracks and/or determines information for assisting wireless devices in mitigating interference. For example, the network node may not need to track CRS assistance information for a wireless device that blind detects/autonomously acquires the CRS assistance information. Selectively relying on blind detection based on the capabilities and other configuration of the wireless device may reduce signaling overhead (e.g., CRS assistance information may need to be updated relatively frequently, so blind detection at the wireless device may reduce frequent signaling of updates from the network node) and may increase accuracy (because the wireless device may tend to have better visibility than the network node with respect to interference conditions at the wireless device).

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

In a wireless network, a wireless device may communicate with one or more radio network nodes to transmit and/or receive voice traffic, data traffic, control signals, and so on. Maintaining good signal quality between the wireless device and the radio network node may allow for good performance, such as high bitrate transmissions or robust control channel performance. However, it may be difficult to maintain good signal quality in complex radio environments. For example, interfering cells may create noise that interferes with the signal quality. Embodiments of the present disclosure may facilitate reducing interference associated with an interfering cell. Particular embodiments are described in FIGS. 1-5 of the drawings, like numerals being used for like and corresponding parts of the various drawings.

Figure 1:
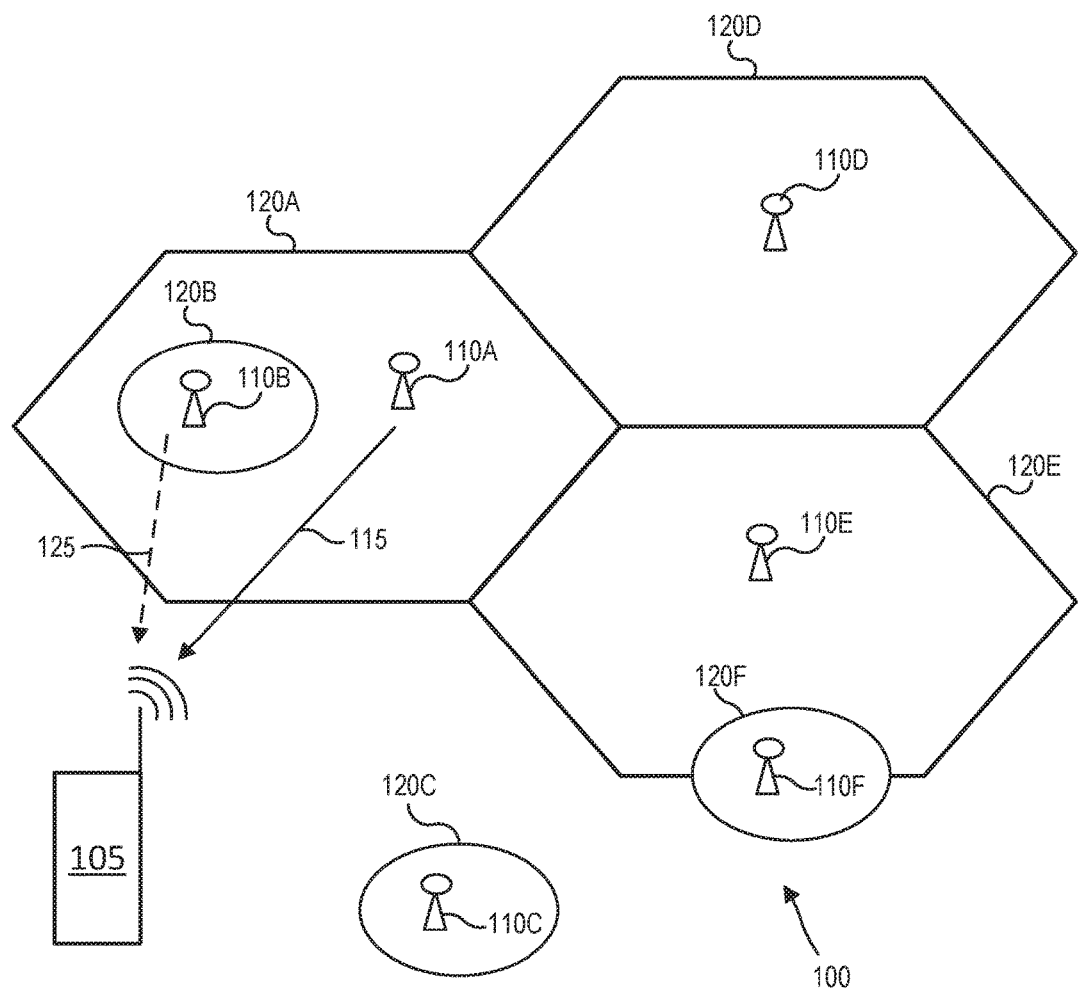
FIG. 1 is a block diagram illustrating an embodiment of a network.

FIG. 1 is a block diagram illustrating embodiments of a network 100 that includes a wireless device 105 and a plurality of network nodes 110. Each network node 110 may have an associated coverage area 120. When wireless device 105 is within the coverage area associated with a network node 110, such as target node 110A, wireless device 105 may communicate with the target node to transmit and/or receive a target signal 115. Target node 110A may be a serving cell or another cell of interest to wireless device 105, and target signal 115 may include voice traffic, data traffic, control signals, and/or any other suitable information communicated between wireless device 105 and target node 110A.

Wireless device 105 may be impacted by an interfering signal 125 from an interfering node, such as interfering node 110B (e.g., an aggressor cell or neighboring cell) in FIG. 1. Interfering signal 125 may interfere with wireless device 105's ability to receive target signal 115 clearly, which may cause performance problems like lower bitrate transmissions between wireless device 105 and target node 110A. Interfering signal 125 may tend to be stronger/cause greater interference when wireless device 105 is located near interfering node 120.

Wireless device 105 may support interference mitigation capabilities to fully or partly eliminate the interference due to interfering signal 125. The term interference mitigation (IM) may be used interchangeably with any of the following similar terms: interference cancellation (IC), interference elimination, interference suppression, interference reduction, interference minimization, and so on. As discussed with respect to FIGS. 2 and 3 below, an ability of wireless device 105 to cancel interference might or might not be improved with the use of assistance information from a network node 110 depending on the configuration of wireless device 105. Accordingly, particular embodiments may selectively send assistance information to wireless device 105, for example, if network node 110 determines that assistance information may improve an ability of wireless device 105 to cancel interference.

In particular embodiments, sending assistance data may improve an ability of wireless device 105 to mitigate interference in the sense that complexity at wireless device 105 may be reduced during the times that wireless device 105 is unable (or less able) to autonomously acquire some or all of the assistance information. As an example, wireless device 105 may be less able to autonomously acquire assistance information when it is configured to handle complex tasks that may require the use of substantial processing power, memory, or other resources of wireless device 105. If network node 110 determines that wireless device 105 may support the complexity associated with autonomously acquiring the assistance information (e.g., based on the configuration information), network node 110 may determine not to send assistance information to wireless device 105. This may reduce complexity at network node 110 and/or reduce signaling overhead. However, if network node 110 determines that wireless device 105 may not support the complexity associated with autonomously acquiring the assistance information, network node 110 may determine to send the assistance information to wireless device 105. Thus, the assistance data sent from network node 110 does not necessarily have to allow wireless device 105 to mitigate more interference than autonomously acquired assistance data in order to improve an ability of wireless device 105 to mitigate interference, for example, by reducing complexity at wireless device 105.

In network 100, each network node 110 may use any suitable radio access technology, such as long term evolution (LTE), LTE-Advanced, UMTS, HSPA, GSM, cdma2000, WiMax, WiFi, and/or other suitable radio access technology. Network nodes 110 may be deployed throughout network 100 as a homogenous deployment, heterogeneous deployment, or mixed deployment. A homogeneous deployment may generally describe a deployment made up of the same (or similar) type of radio network nodes and/or similar coverage and cell sizes and inter-site distances. A heterogeneous deployment may generally describe deployments using a variety of types of radio network nodes having different cell sizes, transmit powers, capacities, and inter-site distances. For example, a heterogeneous deployment may include a plurality of low-power nodes placed throughout a macro-cell layout. Deploying low-power nodes throughout a macro-cell layout may extend capacity in certain traffic hotspots, however, the differences in the various nodes (such as differences in transmit power) may tend to increase the complexity of managing interference in the uplink and/or in the downlink as compared to a homogenous deployment. Mixed deployments may include a mix of homogenous portions and heterogeneous portions.

One type of interference that wireless device 105 may mitigate is cell-specific reference signals (CRS) interference. In 3GPP, for example, interference mitigation (IM) of CRS has been studied in the Rel-11 Work Item on FeICIC. Release 11 specifies CRS interference mitigation (CRS IM) for heterogeneous deployments under the condition where interference from CRS of interfering cells dominates at wireless device 105 but is negligible from data assuming data RE muting. A CRS-IM capable wireless device 105 may include a CRS-IM receiver that may partially or fully mitigate CRS interference received from one or more interfering cells. The CRS-IM receiver may also be combined with other legacy receives such as an MMSE receiver (e.g., MMSE+CRS-IM) or an MMSE-IRC (e.g., MMSE-IRC+CRS-IM). The combined receiver may mitigate interference more effectively and may enhance the overall reception performance of wireless device 105, for example, in terms of increased user throughput. In Rel-12, the performance of wireless device 105 in a homogenous deployment may be further improved by using the same CRS IM capability as defined for FeICIC, for example, when similar interference conditions arise under low traffic loading of neighboring cells and under a similar scope as in FeICIC. It is expected that Rel-12 may specify performance requirements for a CRS-IM receiver for wireless devices 105 operating in homogenous deployments.

In 3GPP, besides the CRS-IM (which may also be referred to as CRS-IC) specified in Rel-11, PSS/SSS IC and PBCH IC have also been standardized. Yet another example of a reference signal IM receiver is DMRS-IM. To enhance UE performance, the cancellation of interference caused by data and control channels (e.g., PDSCH and PDCCH/ePDCCH) of the interfering cell(s) at the UE receiver are under discussion in Rel-12. This may require the UE to implement data/control channel IC, such as PDSCH/PDCCH IC. In Rel-12, how to enhance UE performance by interference cancellation of the interfering cell's data/control channels is still under discussion. How to combine CRS-IM with PDSCH/(e)PDCCH-IC is still under discussion. PDSCH/PDCCH IC may also be combined with MMSE-IRC+CRS-IM, which is still being discussed. CRS-IM can be in various transmission schemes including, but not limited to, CRS-based transmission schemes and DMRS-based transmission schemes. In 3GPP, how to use CRS-IM in TM10 (the transmission mode designed for Coordinated Multi-Point transmission COMP) is being discussed.

3GPP Rel-11 contemplates signaling CRS assistance data from network node 110 to wireless device 105 in order to assist wireless device 105 in performing CRS interference mitigation. CRS assistance data may also be referred to as CRS assistance information or neighbor cell CRS assistance data/information. The CRS assistance information may contain a list of physical cell IDs, antenna port information, and MBSFN subframe configuration of the potential interfering cells. For example:

```
CRS-AssistanceInfoList-r11 ::=    SEQUENCE (SIZE (1..maxCellReport)) OF CRS-
AssistanceInfo-r11
    CRS-AssistanceInfo-r11 ::= SEQUENCE {
        physCellId-r11                                PhysCellId,
        antennaPortsCount-r11                         ENUMERATED {an1, an2,
```

```
an4, spare1},
        mbsfn-SubframeConfigList-r11         MBSFN-SubframeConfigList,
        ...
}
```

As another example, a neighCellsCRS-Info field may contain assistance information concerning the primary frequency used by wireless device 105 to mitigate interference from CRS while performing RRM/RLM/CSI measurement or data demodulation. When the CRS assistance information is received for a cell with a CRS colliding with that of the CRS of the cell to measure, wireless device 105 may use the CRS assistance information to mitigate CRS interference (as specified in TS 36.101) on the subframes indicated by measSubframePatternPCell, measSubframePatternConfigNeigh and csi-MeasSubframeSet1. Furthermore, wireless device 105 may use CRS assistance information to mitigate CRS interference from the cells in the IE for demodulation purposes, as specified in TS 36.101.

When the configuration of the potentially interfering cells is determined/communicated by network node 110, the implementation of CRS interference cancellation in wireless device 105 may be simplified because wireless device 105 may not need to identify the potential interfering cells itself. For example, wireless device 105 may not need to identify the interfering cells whose CRSs cause interference at wireless device 105 if network node 110 provides CRS assistance information that identifies the potentially interfering cells. However, in order to provide such CRS assistance information, network node 110 may need to track CRS interference conditions associated with wireless device 105, create relevant CRS assistance information, and signal the CRS assistance information to wireless device 105. Network node 110 may tend to have less information than wireless device 105 with respect to the interference conditions experienced at wireless device 105. Thus, tracking and creating reliable CRS assistance information may add complexity to network node 110.

Particular embodiments may allow for reducing the complexity at network node 110, for example, by selectively tracking, creating, and sending CRS assistance information for a first subset of wireless devices 105 (e.g., devices less capable of determining CRS interference information themselves) without having to track, create, and send CRS assistance information for a second subset of wireless devices 105 (e.g., devices more capable of determining CRS interference information themselves). As an example, in Rel-12 and later releases, wireless devices 105 may have more computation power which may allow them to implement algorithms with higher complexity. Wireless devices 105 with sufficient computation power and/or ability to implement complex algorithms may be able to perform blind acquisition of CRS assistance information. In blind acquisition, wireless device 105 may determine CRS assistance information itself without requiring network node 110 to provide the CRS assistance information.

In particular embodiments, certain Rel-12 wireless devices may have sufficient ability to perform blind acquisition of CRS assistance information. For example, 3GPP may standardize PDSCH/(e)PDCCH IC to provide for additional complexity in wireless device 105. Compared with PDSCH/(e)PDCCH IC, the complexity of CRS assistance information blind acquisition may be low or negligible. So, if a wireless device 105 supports the complexity of PDSCH/(e)PDCCH IC, it may mean that wireless device 105 also supports the complexity for CRS assistance information blind acquisition (which may be less complex than PDSCH/(e)PDCCH IC).

Thus, in particular embodiments, it may be feasible for certain wireless devices 105 to acquire CRS assistance information without any help from network node 110. Network node 110 may not need to track the CRS interference conditions for such wireless devices 105, which may simplify network node 110. Network node 110 may track the CRS interference conditions for certain other wireless devices 105 that may be less capable of acquiring CRS assistance information without help from network node 110.

Figure 2:
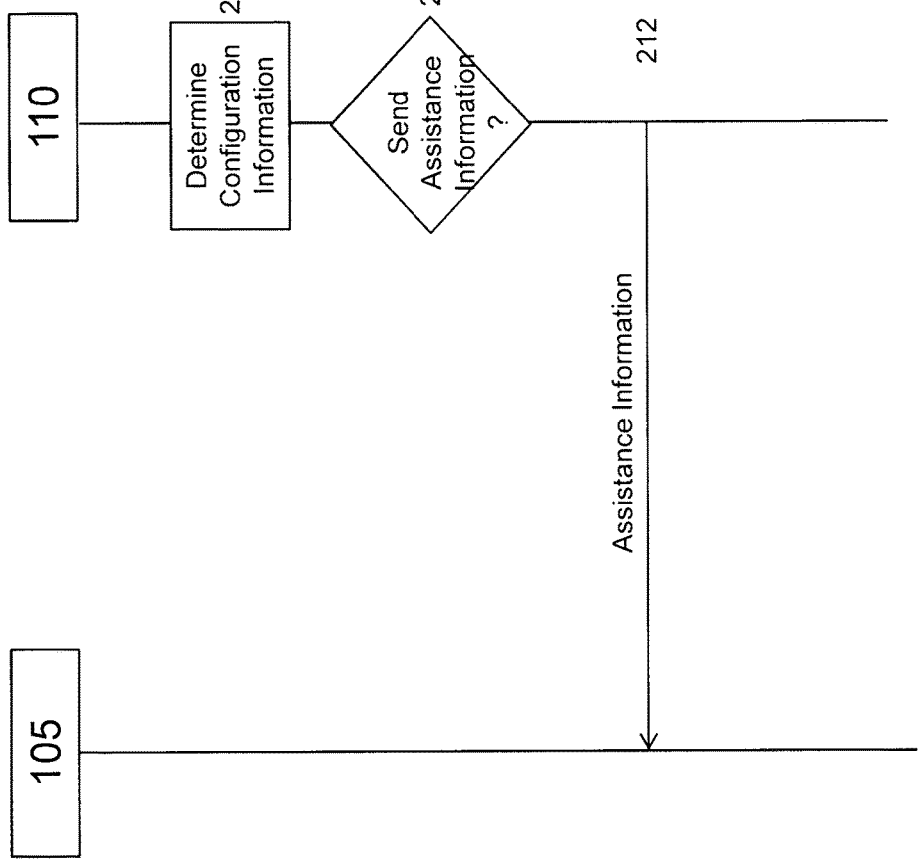
FIG. 2 is a signaling diagram illustrating an exchange of signals in an embodiment of a network.

FIG. 2 is a signaling diagram illustrating an exchange of signals in an embodiment of a network. FIG. 2 generally illustrates particular embodiments of a method 200 in network node 110. Network node 110 may be the serving network node for wireless device 105 or, in the alternative, network node 110 can be a neighboring network node from which wireless device can obtain information. In some embodiments, network node 110 may enable interference mitigation at wireless device 105 by selectively transmitting assistance information to wireless device 105. For example, network node 110 may selectively transmit CRS assistance information to wireless device 105 in order to enable CRS interference mitigation (e.g., mitigation of CRS interference that wireless device 105 receives from interfering cells). The CRS assistance information may include at least the cell IDs of interfering cells (aka inter-cells).

The selective transmission may be based on any suitable configuration information, such as one or more of device capability, device performance, device parameter configuration, and/or device request. Device capability may relate to whether wireless device 105 is capable of interference mitigation of data and/or control channels received from one or more interfering cells. Device performance may indicate whether wireless device 105 is currently performing interference mitigation of data and/or control channels received from one or more interfering cells. Device parameter configuration may indicate a type or characteristic of a mode configured at wireless device 105 or other parameter configurations that have a large impact on the implementation complexity of wireless device 105. Device request may refer to whether wireless device 105 has provided an explicit indication that it does not need assistance information (e.g., CRS assistance information) from network node 110.

The method begins at step 204, where network node 110 may determine configuration information associated with a wireless device 105. Network node 110 may determine the configuration information in any suitable manner. As an example, network node 110 may determine configuration information from one or more sets of information obtained explicitly from wireless device 105 or from another network node, such as a neighboring network node that has the configuration information. In another example, network node 110 may determine configuration information autonomously, for example, by retrieving the configuration information from stored or historical data in the memory of network node 110 or based on recent configuration performed for wireless device 105 (e.g., configured antenna transmission mode). In yet another example, network node 110 may determine configuration information implicitly based on implicit information received from wireless device 105. Examples of implicit information include CSI (CQI, PMI, RI) measurements, signal measurements (e.g. RSRP, RSRQ), ACK/NACK for downlink reception, etc. For example, if the reported CQI is above a threshold and/or a percentage of ACKs over a certain time period is above a threshold, then network node 110 may assume that wireless device 105 is capable of and/or is currently mitigating interference caused by interfering cells on certain channels, such as PDSCH.

In some embodiments, the configuration information may be indicative of interference mitigation capabilities of wireless device 105. In particular embodiments, configuration information can include any one or more of the capability information, current performance information, parameter configuration information, and/or an explicit indicator associated with wireless device 105 discussed in more detail below.

As an example, configuration information may include capability information indicating whether wireless device 105 is capable of blindly (autonomously) acquiring partial or full assistance information, such as CRS assistance information containing information about one or more interfering cells whose CRS interference is to be mitigated.

As another example, configuration information may include capability information indicating whether wireless device 105 is capable of blindly mitigating inter-cell interference of at least one signal other than CRS. The term blind inter-cell interference mitigation may refer to a wireless device capable of performing IC of signals from interfering cells without receiving assistance information from network node 110 about the interfering cells. Certain configuration information may indicate that wireless device is capable of PDSCH IC, PDCCH IC, PBCH IC, etc.

As another example, configuration information may include capability information indicating whether wireless device 105 is capable of mitigating inter-cell interference caused by at least one signal other than CRS provided at least some level of assistance information is received from network node 110. For example, wireless device 105 may be capable of performing PDSCH IC, PDCCH IC, PBCH IC, etc. if network node 110 provides some assistance information (e.g., cell IDs) about interfering cells to wireless device 105. The capability information may be associated with an inter-cell interference mitigation signal other than CRS in a certain deployment scenarios, such as homogeneous network, heterogeneous network, CoMP, RRH, RRU, etc.

As another example, the configuration information may indicate that wireless device is currently performing interference mitigation of data and/or control channels received from one or more interfering cells.

As another example, the configuration information may indicate wireless device 105 parameter configurations, such as a type or characteristics of a mode configured at wireless device 105 for reception of signals at wireless device 105, or other parameter configurations which may have a large impact on the implementation complexity of wireless device 105. Examples of modes configured at wireless device 105 include antenna transmission schemes, such as TM9, TM10, and so on, or carrier aggregation (CA) mode. Examples of other parameter configurations may be bandwidth, antenna ports of the serving cell and/or a list of aggressor/interfering cells, and/or maximum supported spatial streams.

As another example, the configuration information may include an explicit indication from wireless device 105 or from another network node whether or not wireless device 105 needs assistance information (e.g., CRS assistance information) from network node 110 for the purpose of mitigating interference (e.g., CRS interference) from interfering cells. For example, wireless device 105 may indicate that it needs CRS assistance information in case its battery power is below a threshold, available memory is limited or below a threshold, and/or processing capability is limited or below a threshold.

At step 208, network node 110 may determine whether to send assistance information to wireless device 105. For example, network node 110 may determine to send assistance information based on a determination that assistance information may improve an ability of wireless device 105 to mitigate interference. In particular embodiments, sending assistance data may improve an ability of wireless device 105 to mitigate interference in the sense that complexity at wireless device 105 may be reduced during the times that wireless device 105 is unable (or less able) to blindly acquire assistance information. Thus, the assistance data sent from network node 110 does not necessarily have to allow wireless device 105 to mitigate more interference than blindly acquired assistance data in order to improve an ability of wireless device 105 to mitigate interference.

Network node 110 may make the determination whether assistance information may improve an ability of wireless device 105 to mitigate interference based on the configuration information determined at step 204. Based on the determination, network node 110 may determine to send no, partial, or full assistance information to wireless device 105 for assisting wireless device in mitigating interference. As an example, partial CRS assistance information may include certain information, such as the cell IDs of potentially interfering cells, and not include certain other information, such as antenna port information and/or MBSFN subframe configuration of the potentially interfering cells.

In particular embodiments, network node 110 may decide NOT to send any CRS assistance information if the configuration information indicates at least one of: (1) wireless device 105 can blindly acquire CRS assistance information, (2) wireless device 105 can blindly mitigate inter-cell interference of at least one signal other than CRS (or wireless device 105 can mitigate inter-cell interference of at least one signal other than CRS if network assistance is provided to wireless device 105), (3) wireless device 105 is currently mitigating interference caused by data and/or control channels from interfering cells, (4) explicit indication that wireless device 105 does not need CRS assistance information for CRS interference mitigation, and/or (5) wireless device 105 is configured with one or more of the following: (a) transmission mode, TM 10, which may be used for CoMP, (b) a number of carriers for CA is below a threshold, (c) a number of antenna ports in the serving cell is below a threshold, (d) the serving cell bandwidth is below a threshold, and/or (e) the maximum spatial streams is below a threshold.

Otherwise, if none of the above conditions (1-5) are met, then, in particular embodiments, network node 110 may decide to send partial CRS assistance information or full CRS assistance information. The partial CRS assistance information may include, for example, only the cell IDs of interfering cells, whereas full CRS assistance information may also contain antenna port and MBSFN subframe configuration. Network node 110 may decide to send partial CRS assistance information in the case that all the interfering cells have the same or similar transmission configurations, such as the same antenna transmission modes as the serving cell associated with wireless device 105 and/or the same MBSFN configuration as the serving cell. In some embodiments, network node 110 may determine not to send full CRS-assistance information (e.g., send no or partial CRS-assistance information) upon a determination that the wireless device is capable of blindly mitigating interference associated with a non-CRS signal.

In the preceding examples, the decision whether or not to send the assistance information relates to whether assistance information may improve an ability of wireless device 105 to mitigate interference. For example, if wireless device 105 is configured with a single carrier, wireless device 105 may have enough computation resources to blindly acquire CRS assistance information. In this case, wireless device 105 may not need CRS assistance information from network node 110. On the other hand, if wireless device 105 is configured with CA mode, wireless device 105's computation resources may be limited because more resources may be needed for handling multicarrier operation. In this case it may be challenging for wireless device 105 to blindly acquire CRS assistance information. In this mode (e.g. CA mode), it may be helpful for network node 110 to signal CRS assistance information to help wireless device 105 to mitigate the CRS interference.

As another example, when values of one of more parameters are below their respective thresholds, then the CRS assistance information may not need to be sent to wireless device 105. This is because under these conditions wireless device 105 may have more spare resources for blind acquisition of CRS assistance information. Examples of thresholds where wireless device 105 may have more spare resources for blind acquisition of CRS assistance information include a bandwidth threshold (e.g., less than 5 MHz), a number of antenna ports of serving cell (e.g. 2 or fewer antenna ports), a number of aggressor/interfering cells (e.g. 2 or fewer interfering cells), and a number of maximum supported or configured spatial streams (e.g. 2 or fewer spatial streams). Thus, network node 110 may determine that sending assistance information may improve an ability of wireless device 105 to mitigate interference if the configuration information indicates that parameters configured at wireless device 105 have a large impact on implementation complexity of wireless device 105 and/or if the configuration information indicates low availability of computational resources associated wireless device 105.

At step 212, network node 110 sends the assistance information to wireless device 105 in response to determining that the assistance information may improve the ability of wireless device 105 to mitigate interference. Network node 110 may send no, partial, or full assistance information according to the determination in step 208. The assistance information may include information used by wireless device 105 to mitigate interference. As an example, the assistance information may include at least one or more cell identifiers associated with cells that network node 110 determines potentially contribute interference impacting wireless device 105. In some embodiments, network node 110 determines the one or more cells that potentially contribute interference impacting wireless device 105 and, for each cell that potentially contributes interference impacting wireless device 105, includes a cell identifier associated with the cell in the assistance information.

In some embodiments, network node 110 may also explicitly indicate to wireless device 105 that no CRS assistance information is being sent to wireless device 105 (and may also optionally indicate one or more of the reason(s) mentioned above). This may prevent wireless device 105 from misinterpreting the absence of CRS assistance information as an indication that the CRS assistance information was sent by network node 110 but missed, lost, or corrupted before being received by wireless device 105. In some embodiments, network node 110 may reassess whether or not to send assistance information in response to a change in configuration information (e.g., if network node 110 receives changed configuration information, network node 110 may perform the method again beginning at step 204). The method then ends.

Figure 3:
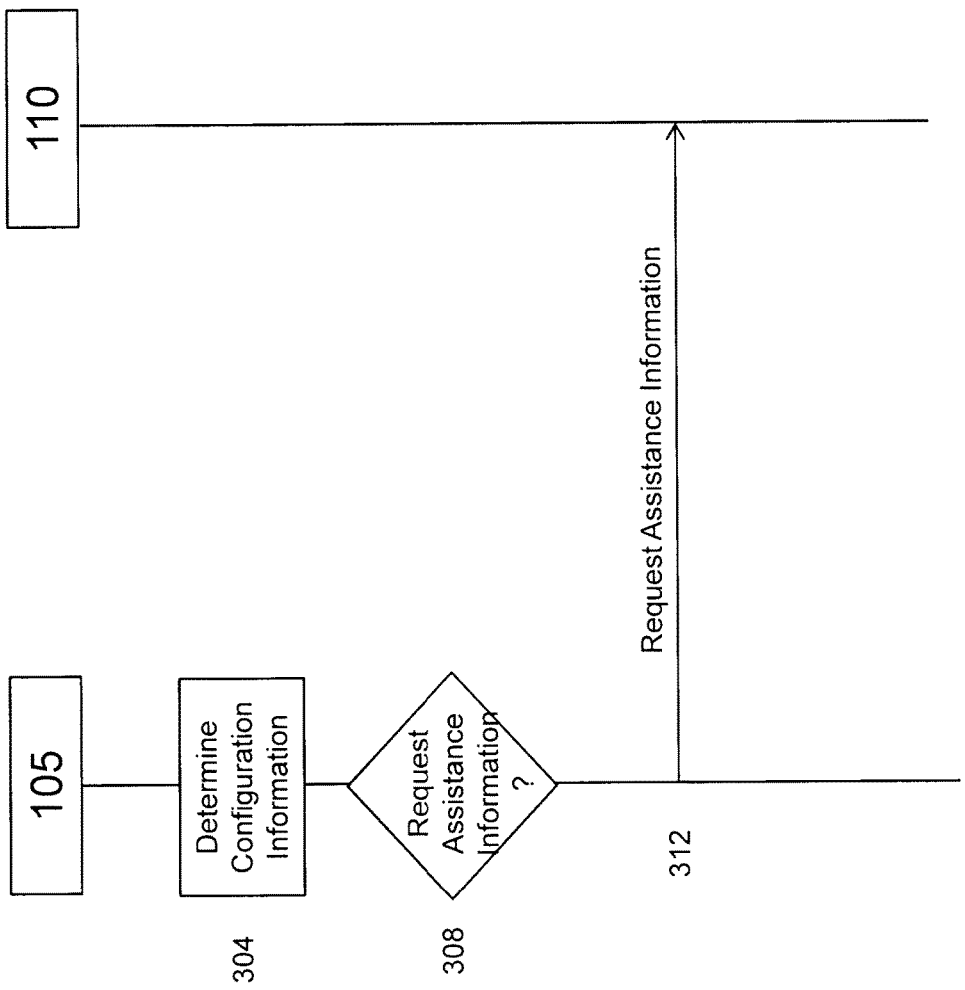
FIG. 3 is a signaling diagram illustrating an exchange of signals in an embodiment of a network.

FIG. 3 is a signaling diagram illustrating an exchange of signals in an embodiment of a network. In general, FIG. 3 illustrates an example embodiment of a method 300 in which wireless device 105 explicitly informs network node 105 that it does or does not require CRS assistance information. For example, wireless device 105 may explicitly request CRS assistance information when needed. In addition, in some embodiments, wireless device 105 may indicate which CRS assistance information it would like network node 110 to send (if any). For example, wireless device 105 may request that network node 110 send (or not send) the cell IDs of potentially interfering cells (aka inter-cells), for mitigating interference of CRS received from interfering cells. In some embodiments, wireless device 105 may explicitly indicate that it does not require any CRS assistance information from network node 110. For example, wireless device 105 may indicate that it is capable of determining CRS assistance information autonomously or that it can reuse the assistance information determined for mitigating another interfering signal or channel using at least one receiver other than CRS-IM.

At step 304, wireless device 105 determines configuration information associated with wireless device 105. The configuration information may be indicative of interference mitigation capabilities of wireless device 105. In particular embodiments, configuration information can include any one or more of capability information, current performance information, parameter configuration information, and/or an explicit indicator associated with wireless device 105 discussed in more detail below.

As an example, configuration information may include capability information indicating whether wireless device 105 is capable of blindly (autonomously) acquiring partial or full assistance information, such as CRS assistance information containing information about one or more interfering cells whose CRS interference is to be mitigated.

As another example, configuration information may include capability information indicating whether wireless device 105 is capable of blindly mitigating inter-cell interference of at least one signal other than CRS. The term blind inter-cell interference mitigation may refer to a wireless device capable of performing IC of signals from interfering cells without receiving assistance information from network node 110 about the interfering cells. Certain configuration information may indicate that wireless device is capable of PDSCH IC, PDCCH IC, PBCH IC, etc.

As another example, configuration information may include capability information indicating whether wireless device 105 is capable of mitigating inter-cell interference caused by at least one signal other than CRS provided at least some level of assistance information is received from network node 110. For example, wireless device 105 may be capable of performing PDSCH IC, PDCCH IC, PBCH IC etc., if network node 110 provides some assistance information (e.g., cell IDs) about interfering cells to wireless device 105. The capability information may be associated with an inter-cell interference mitigation signal other than CRS in certain deployment scenarios, such as homogeneous network, heterogeneous network, CoMP, RRH, RRU, etc.

As another example, the configuration information may indicate that wireless device is currently performing interference mitigation of data and/or control channels received from one or more interfering cells.

As another example, the configuration information may indicate wireless device 105 parameter configurations, such as a type or characteristics of a mode configured at wireless device 105 for reception of signals at wireless device 105, or other parameter configurations that may have a large impact on the implementation complexity of wireless device 105. Examples of modes configured at wireless device 105 include antenna transmission schemes, such as TM9, TM10, and so on, or carrier aggregation (CA) mode. Examples of other parameter configurations may be bandwidth, antenna ports of the serving cell and/or a list of aggressor/interfering cells, and/or maximum supported spatial streams.

As another example, the configuration information may include information that wireless device 105 uses to send an explicit indication whether or not wireless device 105 needs assistance information (e.g., CRS assistance information) from network node 110. For example, configuration information may indicate available battery power and wireless device 105 may indicate that it needs CRS assistance information in case its battery power is below a threshold. As another example, configuration information may indicate available memory and wireless device 105 may indicate that it needs CRS assistance information in case its available memory is below a threshold. As another example, configuration information may indicate processing power and wireless device 105 may indicate that it needs CRS assistance information in case its processing power is below a threshold.

At step 308, wireless device 105 may determine whether assistance information from network node 110 may improve an ability of wireless device 105 to mitigate interference. For example, wireless device 105 may determine whether to request no, partial or full assistance information based on the configuration information determine in step 304. In some embodiments, the assistance information may include CRS assistance information for mitigating CRS interference of CRS received from interfering cells.

In particular embodiments, wireless device 105 may decide NOT to request any CRS assistance information if the configuration information indicates at least one of: (1) wireless device 105 can blindly acquire CRS assistance information, (2) wireless device 105 can blindly mitigate inter-cell interference of at least one signal other than CRS (or wireless device 105 can mitigate inter-cell interference of at least one signal other than CRS if network assistance is provided to wireless device 105), (3) wireless device 105 is currently mitigating interference caused by data and/or control channels from interfering cells, (4) wireless device 105 should generate an explicit indication that wireless device 105 does not need CRS assistance information for CRS interference mitigation (e.g., based on having sufficient battery power, sufficient available memory, and/or sufficient available processing power), and/or (5) wireless device 105 is configured with one or more of the following: (a) transmission mode, TM 10, which may be used for CoMP, (b) a number of carriers for CA is below a threshold, (c) a number of antenna ports in the serving cell is below a threshold, (d) the serving cell bandwidth is below a threshold, and/or (e) the maximum spatial streams is below a threshold.

Otherwise, if none of the above conditions (1-5) are met, then, in particular embodiments, wireless device 105 may decide to request partial CRS assistance information or full CRS assistance information from network node 110. The partial CRS assistance information may include, for example, only the cell IDs of interfering cells, whereas full CRS assistance information may also contain antenna port and MBSFN subframe configuration. Wireless device 105 may decide to request partial CRS assistance information in the case that all the interfering cells have the same or similar transmission configurations, e.g., same antenna transmission modes as in the serving cell associated with wireless device 105 and/or same MBSFN configuration as in the serving cell. In some embodiments, wireless device 105 may determine not to request full CRS-assistance information (e.g., send no or partial CRS-assistance information) upon a determination that wireless device 105 is capable of blindly mitigating interference associated with a non-CRS signal.

In the preceding examples, the decision whether or not to request the assistance information relates to whether assistance information may improve an ability of wireless device 105 to mitigate interference. For example, if wireless device 105 is configured with single carrier, wireless device 105 may have enough computation resources to blindly acquire CRS assistance information. In this case, wireless device may not need CRS assistance information from network node 110. On the other hand, if wireless device 105 is configured with CA mode, wireless device 105's computation resources may be limited because more resources may be needed for handling multicarrier operation. In this case it may be challenging for wireless device 105 to blindly acquire CRS assistance information. In this mode (e.g., CA mode), it may be helpful for network node 110 to signal CRS assistance information to help wireless device 105 to mitigate the CRS interference.

As another example, when values of one of more parameters are below their respective thresholds, then the CRS assistance information may not need to be sent to wireless device 105. This is because under these conditions wireless device 105 may have more spare resources for blind acquisition of CRS assistance information. Examples of thresholds where wireless device 105 may have more spare resources for blind acquisition of CRS assistance information include a bandwidth threshold (e.g., less than 5 MHz), a number of antenna ports of serving cell (e.g., 2 or fewer antenna ports), a number of aggressor/interfering cells (e.g., 2 or fewer interfering cells), and a number of maximum supported or configured spatial streams (e.g., 2 or fewer spatial streams). Thus, wireless device 105 may determine that requesting assistance information may improve an ability of wireless device 105 to mitigate interference if the configuration information indicates that parameters configured at wireless device 105 have a large impact on implementation complexity of wireless device 105 and/or if the configuration information indicates low availability of computational resources associated wireless device 105.

At step 312, wireless device 105 optionally requests assistance information from network node 110 depending upon the determination in step 308. For example, wireless device 105 may request assistance information upon a determination that the assistance information may improve the ability of the wireless device to mitigate interference but may not request assistance information upon a determination that wireless device 105 has sufficient resources and capabilities to blindly detect the assistance information. Thus, in some embodiments, wireless device 105 may optionally transmit a request to network node 110 requesting assistance information depending on whether or not wireless device 105 determines that the assistance information is needed. If wireless device 105 determines that no assistance is needed, wireless device 105 may send an indicator informing network node 110 that wireless device 105 does not require the assistance information in some embodiments. In other embodiments, wireless device 105 may determine that no assistance is needed but need not send an indicator to network node 110.

In response to a request for assistance information, network node 110 may send the assistance information to wireless device 105. Wireless device 105 may use the assistance information to assist with mitigating interference. If wireless device 105 requests no or partial assistance information, wireless device may blindly detect all or some of the assistance information, for example, using the configuration information determined in step 304. In some embodiments, wireless device may determine information about interfering cells (e.g. cell IDs, antenna ports, MBSFN subframe configuration, etc.) for mitigating inter-cell interference caused by at least one signal other than CRS (e.g. PDSCH, PDCCH, etc.) and reuse the information to mitigate CRS interference.

In some embodiments, wireless device 105 determines whether or not CRS assistance information, which may include at least the cell IDs of interfering cell, is received from network node 110 for mitigating CRS interference of CRS received from interfering cells. If the said CRS assistance information is received then wireless device uses said information for mitigating CRS interference of CRS received from interfering cells. Otherwise, wireless device 105 may obtain one or more sets of wireless device 105 configuration information (e.g., according to step 304 above) and use it to determine interfering cells (e.g., cell IDs, antenna ports, MBSFN subframe configuration etc.), which can be or is used for mitigating inter-cell interference caused by at least one signal other than CRS (e.g. PDSCH, PDCCH etc.). Wireless device may use the received CRS assistance information or the determined information about interfering cells for mitigating the CRS interference from the interfering cells.

The embodiments are primarily described for interference mitigation of interference received from interfering cells at the wireless device receiver when wireless device 105 receives signals from cell(s) on one carrier, for example, the serving cell or neighboring cells on a primary carrier or a primary serving carrier. However the embodiments are applicable for interference mitigation of interfering signals received by wireless device 105 on cells of a secondary carrier frequency or on cells of a plurality of secondary carrier frequencies or on cells of any number or combination of primary and/or secondary carrier frequencies.

As described above, embodiments of a network may include one or more wireless devices and one or more different types of network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device may include the components described with respect to FIG. 4 below. Similarly, a network node may include any suitable combination of hardware and/or software. For example, in particular embodiments, an access node may include the components described with respect to FIG. 5 below.

Figure 4:
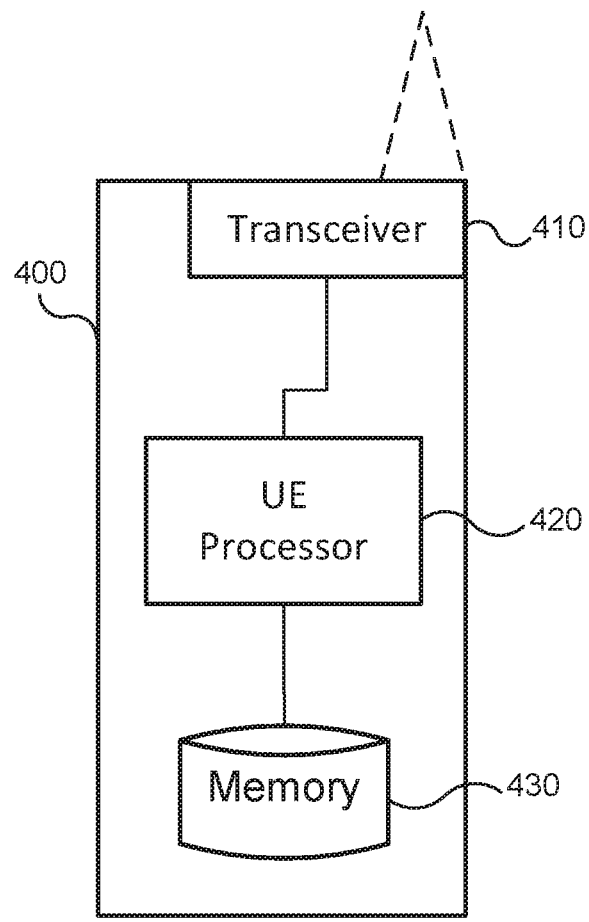
FIG. 4 is a block diagram illustrating embodiments of a wireless device.

FIG. 4 is a block diagram illustrating embodiments of a wireless device 400. Examples of wireless device 400 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, other wireless device capable of D2D operation, or other device that can provide wireless communication. A wireless device 400 may also be referred to as user equipment (UE), a station (STA), or a terminal in some embodiments. Wireless device 400 includes transceiver 410, processor 420, and memory 430. In some embodiments, transceiver 410 facilitates transmitting wireless signals to and receiving wireless signals from an access node (e.g., via an antenna), processor 420 executes instructions to provide some or all of the functionality described above as being provided by wireless devices, and memory 430 stores the instructions executed by processor 420.

Processor 420 may include any suitable combination of hardware and software implemented in one or more modules to execute instructions and manipulate data to perform some or all of the described functions of wireless device 400. In some embodiments, processor 420 may include, for example, one or more computers, one or more central processing units (CPUs), one or more microprocessors, one or more applications, and/or other logic.

Memory 430 is generally operable to store instructions, such as a computer program, software, an application including one or more of logic, rules, algorithms, code, tables, etc. and/or other instructions capable of being executed by a processor. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 400 may include additional components beyond those shown in FIG. 4 that may be responsible for providing certain aspects of the wireless device's functionality, including any of the functionality described above and/or any additional functionality (including any functionality necessary to support the solution described above).

Figure 5:
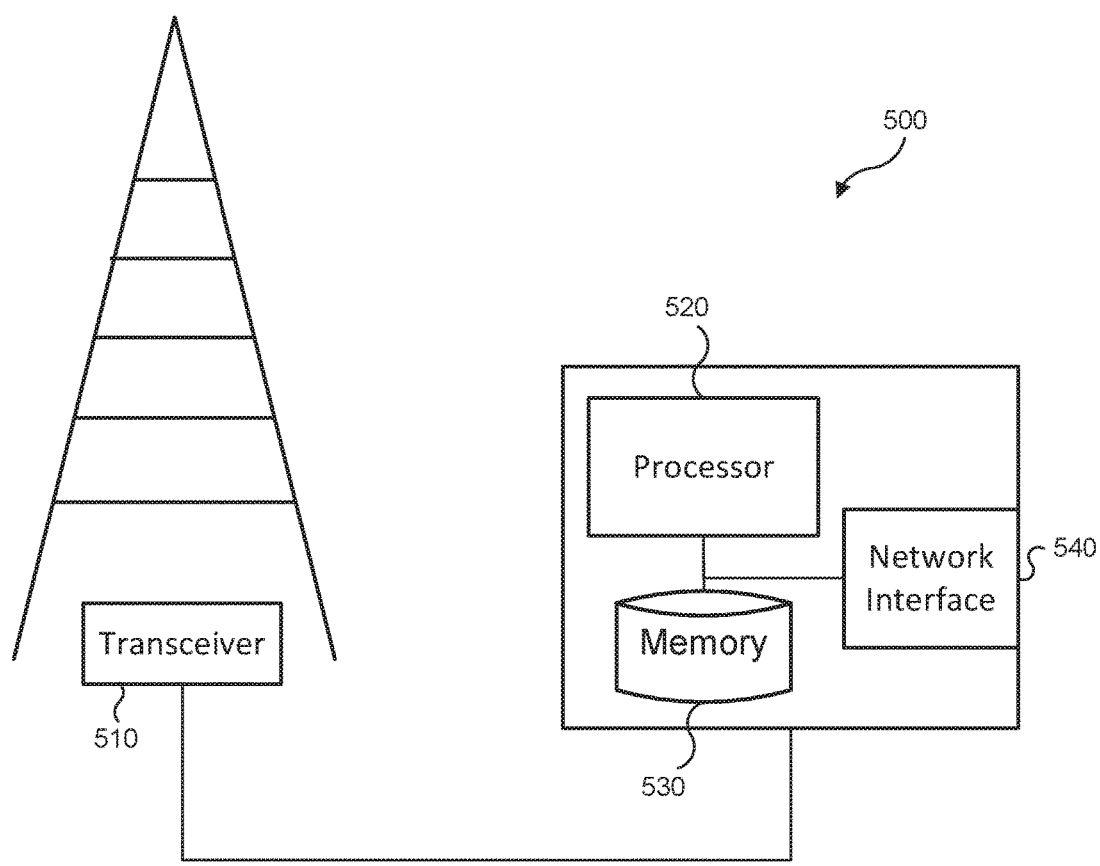
FIG. 5 is a block diagram illustrating embodiments of a network node.

FIG. 5 is a block diagram illustrating embodiments of a network node 500. Examples of network node 500 include an eNodeB, a node B, a base station, a wireless access point (e.g., a Wi-Fi access point), a low power node, a base station controller, a radio network controller, a relay, a donor node controlling relay, a base transceiver station (BTS), transmission points, transmission nodes, RRU, RRH, nodes in a distributed antenna system (DAS), a core network node, an MME, etc. Network node 500 may include one or more of transceiver 510, processor 520, memory 530, and network interface 540. In some embodiments, transceiver 510 facilitates transmitting wireless signals to and receiving wireless signals from a wireless device (e.g., via an antenna), processor 520 executes instructions to provide some or all of the functionality described above as being provided by an access node, memory 530 stores the instructions executed by processor 520, and network interface 540 communicates signals to backend network components, such as a gateway, switch, router, Internet, Public Switched Telephone Network (PSTN), etc.

Processor 520 may include any suitable combination of hardware and software implemented in one or more modules to execute instructions and manipulate data to perform some or all of the described functions of network node 500. In some embodiments, processor 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 540 is communicatively coupled to processor 520 and may refer to any suitable device operable to receive input for network node 500, send output from network node 500, perform suitable processing of the input or output or both, communicate to other devices, or any combination of the preceding. Network interface 540 may include appropriate hardware (e.g., port, modem, network interface card, etc.) and software, including protocol conversion and data processing capabilities, to communicate through a network.

Other embodiments of network node 500 may include additional components beyond those shown in FIG. 5 that may be responsible for providing certain aspects of the access node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

In some embodiments, network node 500 determines configuration information associated with wireless device 400. The configuration information may be indicative of interference mitigation capabilities of wireless device 400. Network node 500 determines, based on the configuration information, whether assistance information may improve an ability of wireless device 400 to mitigate interference. Network node 500 sends the assistance information to wireless device 400 in response to determining that the assistance information may improve the ability of wireless device 400 to mitigate interference. The assistance information includes information used by wireless device 400 to mitigate interference. In some embodiments, the assistance information includes cell-specific reference signal (CRS)-assistance information. Network node 500 may determine to send no or partial CRS-assistance information (rather than full CRS-assistance information) in some circumstances, such as upon a determination that the wireless device is capable of blindly acquiring the CRS-assistance information or upon a determination that the wireless device is capable of blindly mitigating interference associated with a non-CRS signal.

In some embodiments, network node 500 determines the assistance information may improve the ability of wireless device 400 to mitigate interference, for example, if the configuration information indicates low availability of computational resources associated with wireless device 400, if the configuration information indicates that parameters configured at wireless device 400 have a large impact on implementation complexity of wireless device 400, or for any other suitable reason. As an example, the parameters configured at wireless device 400 may have a large impact on implementation complexity at wireless device 400 if the configured parameters increase the complexity, for example, based on the configuration of antenna transmission schemes, such as TM9, TM10, and so on, the configuration of carrier aggregation (CA) mode, or the bandwidth, antenna ports of the serving cell and/or a list of aggressor/interfering cells, and/or maximum supported spatial streams exceeding a threshold. Network node 500 may determine to send the assistance information upon a determination that the configured parameters increase complexity at wireless device 400 (e.g., if complexity at wireless device 400 increases to an extent that wireless device 400 may be unable or less able to autonomously acquire some or all of the assistance information). Otherwise, network node 500 may not send the assistance information.

In some embodiments, the assistance information includes at least one or more cell identifiers associated with cells that network node 500 determines potentially contribute interference impacting wireless device 400. For example, network node 500 may determine one or more cells that potentially contribute interference impacting wireless device 400 and, for each cell that potentially contributes interference impacting wireless device 400, include a cell identifier associated with the cell in the assistance information. Assistance information may optionally include other information, such as antenna port information, MBSFN subframe configuration, and so on.

Although the preceding example describes an embodiment in which network node 500 may send the assistance information to wireless device 400 in response to determining that the assistance information may improve the ability of wireless device 400 to mitigate interference, network node 500 may determine whether or not to send the assistance information based on other reasons. For example, network node 500 may determine not to send assistance information to wireless device 400 upon a determination to reduce complexity at network node 500 and/or a determination to reduce signaling overhead. Thus, in some embodiments, network node 500 may determine whether or not to send the assistance information based on the configuration of network node 500 and/or the configuration of wireless device 400. The configuration of network node 500 and the configuration of wireless device 400 may be indicative of the complexity supported by each of them.

In some embodiments, wireless 400 determines configuration information associated with wireless device 400. The configuration information may be indicative of interference mitigation capabilities of wireless device 400. Wireless device 400 may determine, based on the configuration information, whether assistance information may improve the ability of wireless device 400 to mitigate interference. Wireless device 400 may optionally request assistance information from network node 500. For example, wireless device 400 may request assistance information upon a determination that the assistance information may improve the ability of the wireless device to mitigate interference.

The assistance information may include information used by the wireless device to mitigate interference. In some embodiments, the assistance information includes at least one or more cell identifiers associated with cells that network node 500 determines potentially contribute interference impacting wireless device 400. Assistance information may optionally include other information, such as antenna port information, MBSFN subframe configuration, and so on.

In some embodiments, wireless device 400 may optionally send an indicator informing network node 500 that wireless device 400 does not require the assistance information (or does not require full assistance information). As an example, wireless device 400 may determine that it is capable of blindly acquiring cell-specific reference signal (CRS)-assistance information and, in response to the determination, may send an indicator informing network node 500 that wireless device 400 does not require CRS-assistance information to be provided by network node 500. As another example, wireless device 400 may determine that it is capable of blindly mitigating interference associated with a non-cell-specific reference signal (non-CRS) signal and, in response to the determination, may send an indicator informing network node 500 that wireless device 400 does not require full CRS-assistance information to be provided by network node 500. In some embodiments, wireless device 400 may not need any CRS-assistance information to be provided by network node 500.

In some embodiments, wireless device 400 determines the assistance information may improve the ability of wireless device 400 to mitigate interference, for example, if the configuration information indicates low availability of computational resources associated with wireless device 400, if the configuration information indicates that parameters configured at wireless device 400 have a large impact on implementation complexity of wireless device 400, or for any other suitable reason. As an example, the parameters configured at wireless device 400 may have a large impact on implementation complexity at wireless device 400 if the configured parameters increase the complexity, for example, based on the configuration of antenna transmission schemes, such as TM9, TM10, and so on, the configuration of carrier aggregation (CA) mode, or the bandwidth, antenna ports of the serving cell and/or a list of aggressor/interfering cells, and/or maximum supported spatial streams exceeding a threshold.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP 3rd Generation Partnership Project
E-UTRA Evolved Universal Terrestrial Radio Access
eNB E-UTRAN Node B
PSS Primary synchronization signals
SSS Secondary synchronization signals
PBCH Physical broadcast channel
PDSCH Physical downlink share channel
PDCCH Physical downlink control channel
ePDCCH Enhanced downlink control channel
QCL Quasi co-located
NAIC Network assistant interference cancelation
COMP Coordinated Multi-Point transmission
LTE Long Term Evolution
FeICIC Further enhanced inter-cell interference coordination
UE User equipment
CRS Cell-specific reference signal
IC Interference cancellation
IM Interference mitigation

What is claimed:

1. A method in a network node, comprising:
   determining configuration information associated with a wireless device, the configuration information indicative of interference mitigation capabilities of the wireless device;
   determining, based on the configuration information, whether assistance information may improve an ability of the wireless device to mitigate interference; and
   sending the assistance information to the wireless device in response to determining that the assistance information may improve the ability of the wireless device to mitigate interference, the assistance information comprising information used by the wireless device to mitigate interference; wherein
   the assistance information comprises cell-specific reference signal (CRS)-assistance information and the network node determines not to send the CRS-assistance information upon a determination that the wireless device is capable of blindly acquiring the CRS-assistance information.

2. The method of claim 1, further comprising:
   determining that the assistance information may improve the ability of the wireless device to mitigate interference if the configuration information indicates low availability of computational resources associated the wireless device.

3. The method of claim 1, wherein:
   the assistance information comprises cell-specific reference signal (CRS)-assistance information and the method determines not to send full CRS-assistance information upon a determination that the wireless device is capable of blindly mitigating interference associated with a non-CRS signal.

4. The method of claim 1, further comprising:
   determining one or more cells that potentially contribute interference impacting the wireless device; and
   for each cell that potentially contributes interference impacting the wireless device, including a cell identifier associated with the cell in the assistance information.

5. The method of claim 1, wherein the assistance information comprises at least one or more cell identifiers associated with cells that the network node determines potentially contribute interference impacting the wireless device.

6. The method of claim 1, wherein the network node determines that assistance information may improve an ability of the wireless device to mitigate interference if the configuration information indicates that parameters configured at the wireless device have a large impact on implementation complexity of the wireless device.

7. A network node operable to:
 determine configuration information associated with a wireless device, the configuration information indicative of interference mitigation capabilities of the wireless device;
 determine, based on the configuration information, whether assistance information may improve an ability of the wireless device to mitigate interference; and
 send the assistance information to the wireless device in response to determining that the assistance information may improve the ability of the wireless device to mitigate interference, the assistance information comprising information used by the wireless device to mitigate interference; wherein the assistance information comprises cell-specific reference signal (CRS)-assistance information and the network node operable to determine not to send the CRS-assistance information upon a determination that the wireless device is capable.

8. The network node of claim 7, further operable to:
 determine that the assistance information may improve the ability of the wireless device to mitigate interference if the configuration information indicates low availability of computational resources associated the wireless device.

9. The network node of claim 7, wherein the assistance information comprises cell-specific reference signal (CRS)-assistance information and the network node further operable to:
 determine not to send full CRS-assistance information upon a determination that the wireless device is capable of blindly mitigating interference associated with a non-CRS signal.

10. The network node of claim 7, further operable to:
 determine one or more cells that potentially contribute interference impacting the wireless device; and
 for each cell that potentially contributes interference impacting the wireless device, include a cell identifier associated with the cell in the assistance information.

11. The network node of claim 7, wherein the assistance information comprises at least one or more cell identifiers associated with cells that the network node determines potentially contribute interference impacting the wireless device.

12. The network node of claim 7, the network node further operable to:
 determine that assistance information may improve an ability of the wireless device to mitigate interference if the configuration information indicates that parameters configured at the wireless device have a large impact on implementation complexity of the wireless device.

13. A method in a wireless device, comprising:
 determining configuration information associated with the wireless device, the configuration information indicative of interference mitigation capabilities of the wireless device;
 determining, based on the configuration information, whether assistance information may improve the ability of the wireless device to mitigate interference;
 requesting assistance information from a network node upon a determination that the assistance information may improve the ability of the wireless device to mitigate interference, the assistance information comprising information used by the wireless device to mitigate interference;
 determining that the wireless device is capable of blindly acquiring cell-specific reference signal (CRS)-assistance information; and
 sending an indicator informing the network node that the wireless device does not require the CRS-assistance information.

14. The method of claim 13, further comprising:
 determining that the assistance information may improve the ability of the wireless device to mitigate interference if the configuration information indicates low availability of computational resources associated the wireless device.

15. The method of claim 13, further comprising:
 determining that the wireless device is capable of blindly mitigating interference associated with a non-cell-specific reference signal (non-CRS) signal; and
 sending an indicator informing the network node that the wireless device does not require full CRS-assistance information.

16. The method of claim 13, wherein the assistance information comprises at least one or more cell identifiers associated with cells that the network node determines potentially contribute interference impacting the wireless device.

17. A wireless device operable to:
 determine configuration information associated with the wireless device, the configuration information indicative of interference mitigation capabilities of the wireless device;
 determine, based on the configuration information, whether assistance information may improve the ability of the wireless device to mitigate interference;
 request assistance information from a network node upon a determination that the assistance information may improve the ability of the wireless device to mitigate interference, the assistance information comprising information used by the wireless device to mitigate interference;
 determine that the wireless device is capable of blindly acquiring cell-specific reference signal (CRS)-assistance information; and
 send an indicator informing the network node that the wireless device does not requires the CRS-assistance information.

18. The wireless device of claim 17, further operable to:
 determine that the assistance information may improve the ability of the wireless device to mitigate interference if the configuration information indicates low availability of computational resources associated the wireless device.

19. The wireless device of claim 17, further operable to:
 determine that the wireless device is capable of blindly mitigating interference associated with a non-cell-specific reference signal (non-CRS) signal; and
 send an indicator informing the network node that the wireless device does not require full CRS-assistance information.

20. The wireless device of claim 17, wherein the assistance information comprises at least one or more cell identifiers associated with cells that the network node determines potentially contribute interference impacting the wireless device.

* * * * *